Jan. 20, 1925.  W. H. CLARK  1,523,533
MOWING MACHINE ATTACHMENT
Filed Aug. 15, 1922   3 Sheets-Sheet 2
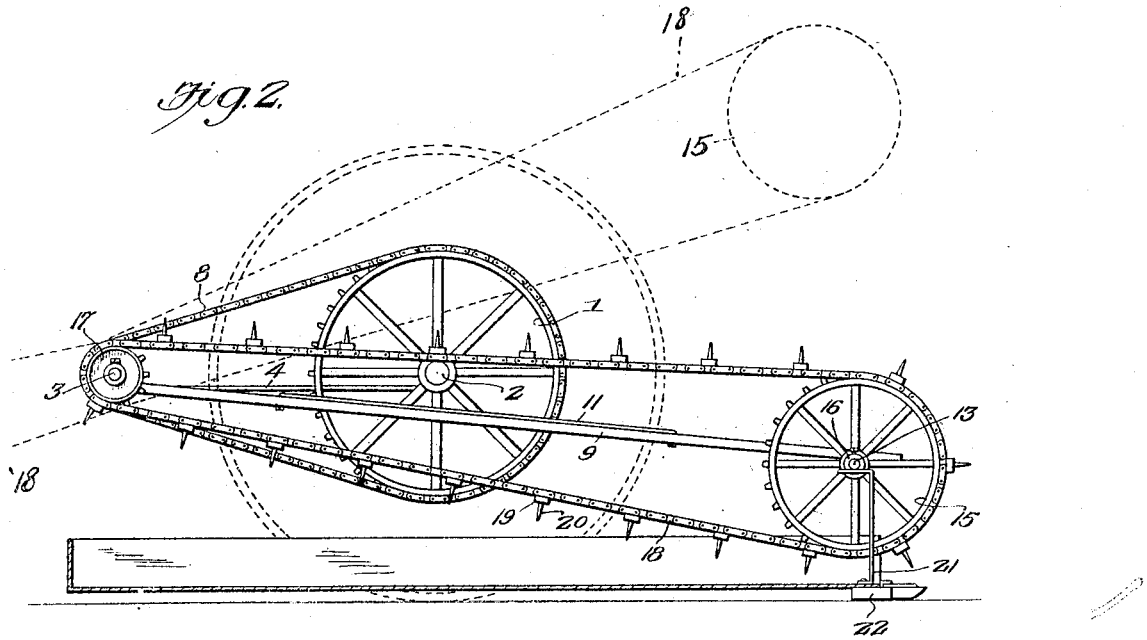
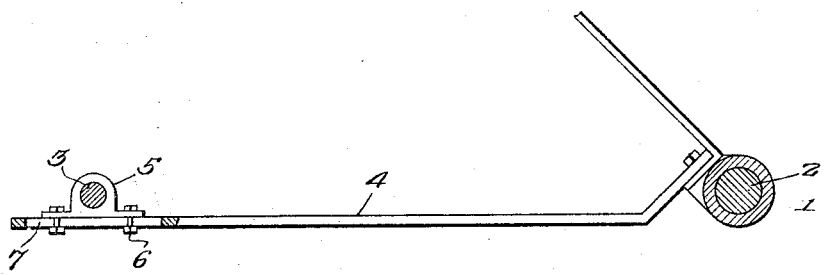
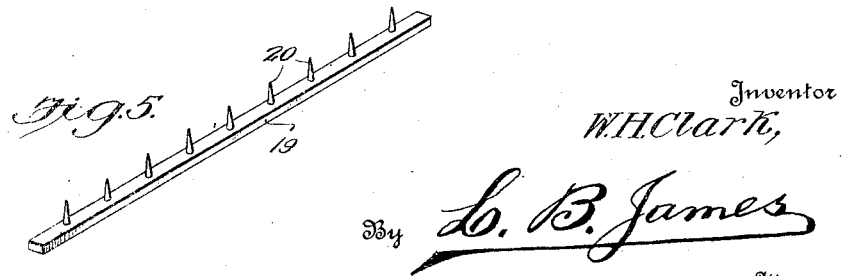
Inventor
W. H. Clark,
By L. B. James
Attorney Inventor
W. H. Clark,
By L. B. James
Attorney Patented Jan. 20, 1925.

1,523,533

UNITED STATES PATENT OFFICE.

WILLIAM H. CLARK, OF GRENADA, MISSISSIPPI.

MOWING-MACHINE ATTACHMENT.

Application filed August 15, 1922. Serial No. 581,985.

*To all whom it may concern:*

Be it known that I, WILLIAM H. CLARK, a citizen of the United States, residing at Grenada, in the county of Grenada and State of Mississippi, have invented new and useful Improvements in Mowing-Machine Attachments, of which the following is a specification.

This invention relates to a rake attachment for mowing machines, the general object of the invention being to provide means for raking the hay away from the cutting knives with means for driving the rake from one of the ground wheels.

Another object of the invention is to locate the drive shaft at the rear of the mower and to so arrange the parts as to eliminate danger of the hay being entangled in the moving parts.

A still further object of the invention is to so arrange the front part of the rake that it may rise when engaging a pile of hay that is higher than the supports of the rake and thus accommodate itself to the work to be done.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 2 is a side view.

Figure 4 is a rear view.

Figure 1:
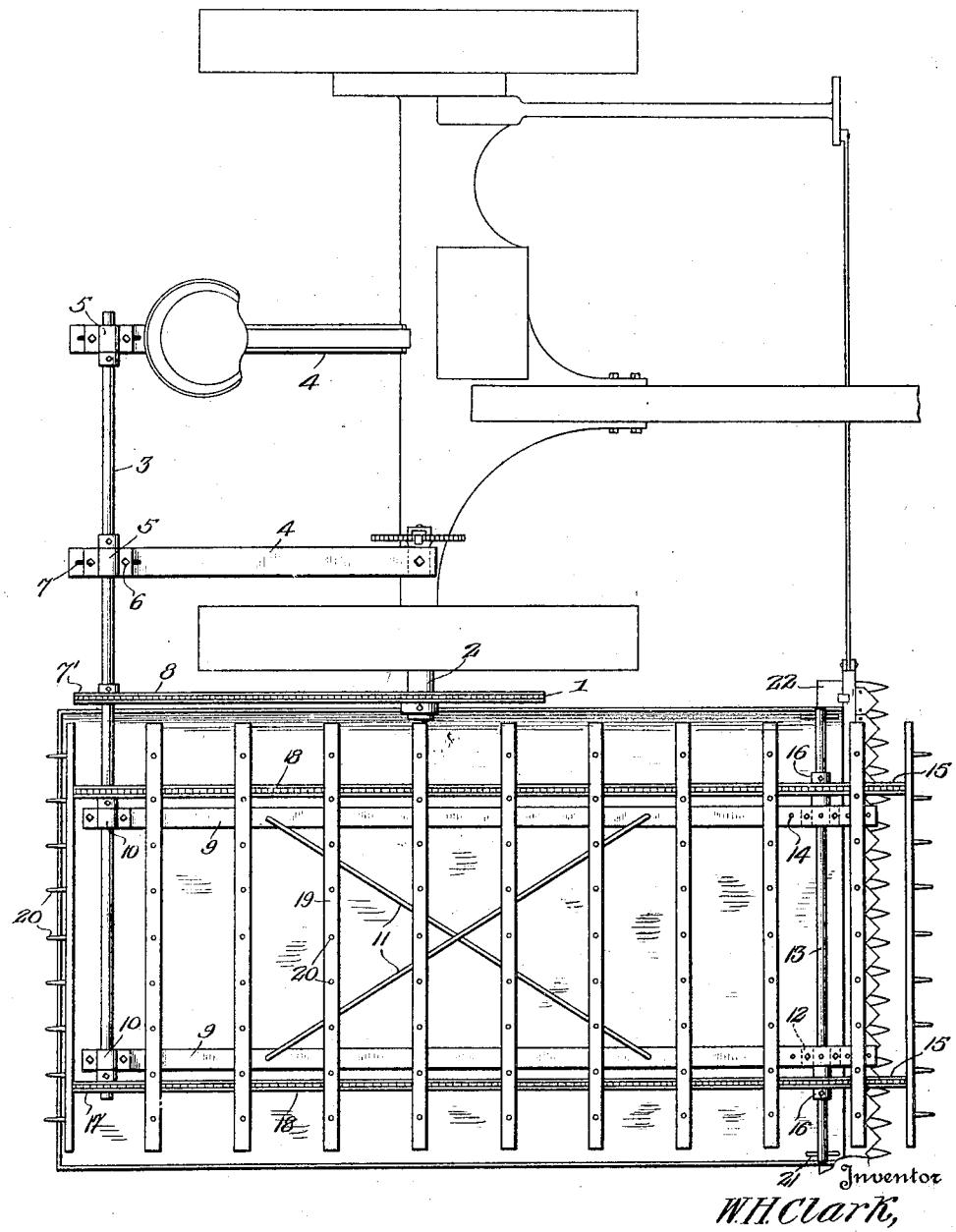
Figure 1 is a plan view of a mower showing my device in use.
Figure 3:
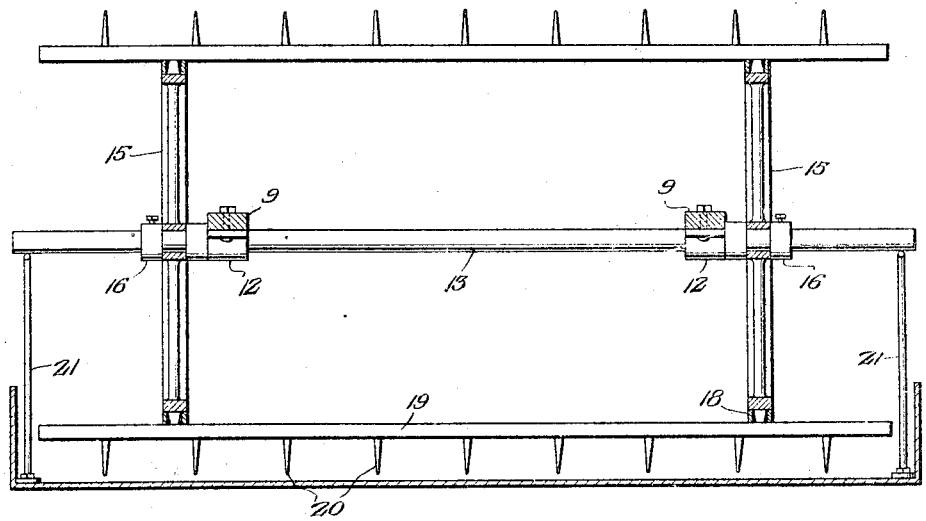
Figure 3 is a front view.
Figure 6:
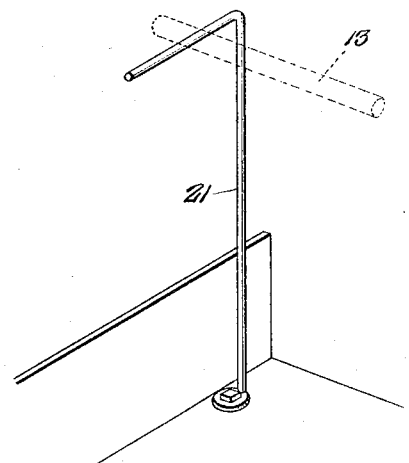
Figure 7:
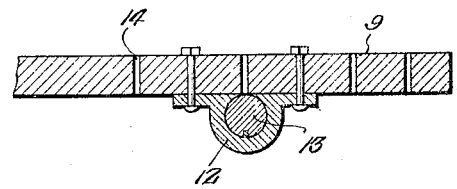

The remaining figures are detail views.

In these views 1 indicates a sprocket wheel which is connected with one end of the mower axle 2, said sprocket wheel being secured to the axle by a set screw or the like. A drive shaft 3 is secured to the rear part of the mower by the supporting bars 4. One of these bars is secured to the mower where the seat fastens on to the frame of the mower and the other bar is secured to the frame of the mower by the bolt that fastens the adjusting lever to the mower, this latter bar being near the right hand wheel of the mower. The bearings 5 are adjustably secured to these bars by the bolts 6 passing through the slots 7 in the bars. Thus the shaft can be adjusted on the bar frame. This shaft has secured thereto a sprocket 7 which is connected with the sprocket 1 by the chain 8 so that the shaft 3 will be rotated as the mower travels along. A pair of supporting bars 9 are pivotally connected with the outer part of the shaft 3 by the bearings 10 so that these bars can be swung in a vertical plane on the shaft. The bars are connected together by the brace rods 11 and their outer ends carry clamps 12 for a shaft 13. The clamps are adjustably connected with the bars by the bolts passing through any pair of a number of holes 14 in the bars. A pair of sprocket wheels 15 are rotatably mounted on the shaft 13 by means of the collars 16 and a pair of sprocket wheels 17 are connected with the shaft 3. Endless chains 18 engage the sprockets 15 and 17 of each pair and cross strips 19 are connected with these chains. These cross strips carry spikes 20 for engaging the hay. Upright rods 21 have one of their ends connected with the cutter bar of the mower, which is shown at 22, and their opposite or upper ends are bent at right angles to form supports for the shaft 13. Fastened by the elements which connect the upright rods 21 to the cutter bar 22 is a rearwardly extending scoop 50 adapted to lie beneath the swinging bars 9 and elements carried thereby to collect the grain as it is harvested. The shaft 13 rests upon the rods so that the entire front part of the rake can be lifted, the bars 9 swinging on the shaft 3. The upright rods also act to prevent the spikes from scratching the seed pan and by swinging the parts upwardly upon the drive shaft the seed can be removed from the said pans. By making the clamps for the shaft 13 adjustable slacks can be taken out of the chains 18.

Attention is called to the fact that the drive chain travels backwardly to shaft 3 so that there is no danger of the hay becoming entangled in the same. In cutting short or thin hay the supporting rods 21 will prevent the spikes from touching the seed pan. In cutting high hay the front part of the rake device will leave the upright rods and climb upon the hay and pull it off no matter how high the hay is. The rake device can also be swung out of the way to permit access to the seed pans.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

The combination with a mowing machine, a rotatable shaft journaled on the rear portion of the mowing machine and having one end extending beyond the side of the machine, a frame having a secured and free end, the former being journaled on the extended portion of the shaft and the latter disposed approximately over the cutter bar of the mowing machine, a rotatable shaft carried by the free end of the frame, sprocket wheels splined on the first mentioned shaft, sprocket wheels of greater diameter than the first mentioned sprocket wheels splined on the second mentioned shaft, a conveyor trained over the sprocket wheels with its lowermost stretch directed upwardly from the front thereof, a horizontally disposed scoop rigidly secured to the cutter bar and extended rearwardly beyond the first mentioned shaft, rods having secured and bent free ends, the former being secured to the forward portion of the scoop and the latter disposed to form rests for the free end of the frame, and means connected to the first mentioned shaft for transmitting an under-sweeping motion to the front end of the conveyor.

In testimony whereof I affix my signature.

WILLIAM H. CLARK.